(12) United States Patent
Shuster (10) Patent No.: US 9,843,771 B2
(45) Date of Patent: *Dec. 12, 2017

(54) REMOTE TELEPRESENCE SERVER

(71) Applicant: Gary Stephen Shuster, Fresno, CA (US)

(72) Inventor: Gary Stephen Shuster, Fresno, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/270,245

(22) Filed: May 5, 2014

(65) Prior Publication Data

US 2014/0240442 A1  Aug. 28, 2014

Related U.S. Application Data

(62) Division of application No. 13/215,172, filed on Aug. 22, 2011, now Pat. No. 8,717,447.

(Continued)

(51) Int. Cl.
*H04N 7/15* (2006.01)
*G02B 27/01* (2006.01)
(Continued)

(52) U.S. Cl.
CPC ........... *H04N 7/157* (2013.01); *G02B 27/017* (2013.01); *G06F 3/013* (2013.01); *G06F 3/016* (2013.01); *H04L 12/1822* (2013.01); *H04L 67/38* (2013.01); *H04N 21/2187* (2013.01); *H04N 21/4223* (2013.01); *A63F 2300/5553* (2013.01); *A63F 2300/8082* (2013.01);
(Continued)

(58) Field of Classification Search
CPC ............... H04N 5/232; H04N 5/23206; H04N 5/23216; H04N 7/157
See application file for complete search history.

(56) References Cited

U.S. PATENT DOCUMENTS 5,745,161 A * 4/1998 Ito ............................. H04N 7/15
348/14.09
6,133,941 A * 10/2000 Ono .................... H04N 5/23206
348/14.05

(Continued)

FOREIGN PATENT DOCUMENTS

WO        2010102288 A2    9/2010

OTHER PUBLICATIONS

Article entitled "Patients' Perceptions of a Telemedicine Specialty Clinic" by F.Mair, P.Whitten, C.May and GC.Doolittle published in the Journal of Telemedicine and Telecare by The Royal Society of Medicine Press Ltd.

*Primary Examiner* — Timothy J Henn
(74) *Attorney, Agent, or Firm* — Sherrie Flynn; Coleman & Horowitt LLP (57) ABSTRACT

A method and apparatus for controlling a live avatar include features for directing the live avatar gaze to be consistent with a remote operator's view of the live avatar's surroundings. Indication of gaze direction may be continuously provided to the live avatar using movable optics, for example a heads-up display, or a movable optical prism or lens. Gaze direction or operator commands may be communicated using a haptic device. Video and control streams from multiple live avatars may be aggregated through a host server and allocated via an online interface to multiple prospective remote operators.

20 Claims, 2 Drawing Sheets

Related U.S. Application Data (60) Provisional application No. 61/375,394, filed on Aug. 20, 2010.

(51) Int. Cl.

| | | |
|---|---|---|
| *G06F 3/01* | (2006.01) | |
| *H04L 12/18* | (2006.01) | |
| *H04N 21/21* | (2011.01) | |
| *H04N 21/422* | (2011.01) | |
| *H04N 21/2187* | (2011.01) | |
| *H04N 21/4223* | (2011.01) | |
| *H04L 29/06* | (2006.01) | |
| *H04M 1/725* | (2006.01) | |

(52) U.S. Cl.
CPC ............... *G02B 2027/014* (2013.01); *G02B 2027/0138* (2013.01); *G02B 2027/0178* (2013.01); *G02B 2027/0187* (2013.01); *H04M 1/72544* (2013.01)

(56) References Cited

U.S. PATENT DOCUMENTS

| | | | |
|---|---|---|---|
| 6,208,379 B1* | 3/2001 | Oya .................. G08B 13/1968 | 348/143 |
| 6,556,241 B1* | 4/2003 | Yoshimura ......... H04N 5/23206 | 348/143 |
| 6,753,899 B2 | 6/2004 | Lapalme et al. | |
| 6,889,120 B2 | 5/2005 | Jouppi | |
| 6,925,357 B2 | 8/2005 | Wang et al. | |
| 7,123,285 B2 | 10/2006 | Smith et al. | |
| 7,443,283 B2 | 10/2008 | Schmandt et al. | |
| 7,593,546 B2 | 9/2009 | Jouppi | |
| 7,698,450 B2* | 4/2010 | Monroe ................. H04N 7/181 | 709/218 |
| 8,208,024 B2* | 6/2012 | Dischinger ....... G08B 13/19621 | 348/143 |
| 8,520,052 B2 | 8/2013 | Venolia et al. | |
| 8,717,447 B2* | 5/2014 | Shuster ................ G02B 27/017 | 348/14.16 |
| 2001/0026318 A1* | 10/2001 | Yonezawa ........ G08B 13/19645 | 348/159 |
| 2004/0189701 A1 | 9/2004 | Badt | |
| 2005/0088533 A1* | 4/2005 | Wang ................. H04N 5/23206 | 348/211.99 |
| 2005/0267826 A1* | 12/2005 | Levy ..................... B25J 9/1689 | 705/34 |
| 2006/0244839 A1* | 11/2006 | Glatron ..................... G06F 9/52 | 348/211.11 |
| 2007/0063849 A1 | 3/2007 | Rosella et al. | |
| 2007/0199108 A1 | 8/2007 | Angle et al. | |
| 2007/0206094 A1* | 9/2007 | Demizu .......... G08B 13/19671 | 348/143 |
| 2010/0097473 A1* | 4/2010 | Park ................... H04N 5/23203 | 348/159 |
| 2010/0198579 A1 | 8/2010 | Cunnington et al. | |
| 2010/0321465 A1* | 12/2010 | Behrens ............. H04L 12/1818 | 348/14.02 |
| 2011/0288684 A1 | 11/2011 | Farlow et al. | |
| 2012/0038739 A1 | 2/2012 | Welch et al. | |
| 2012/0185095 A1 | 7/2012 | Rosenstein et al. | |
| 2012/0306995 A1 | 12/2012 | Huitema et al. | |

* cited by examiner

REMOTE TELEPRESENCE SERVER

CROSS-REFERENCE TO RELATED APPLICATION

This application is a divisional of application Ser. No. 13/215,172, now U.S. Pat. No. 8,717,447, which claims priority pursuant to 35 U.S.C. §119(e) to U.S. provisional application Ser. No. 61/375,394, filed Aug. 20, 2010, which is hereby incorporated by reference in its entirety.

BACKGROUND

1. Field

The present disclosure relates to remote telepresence using a live avatar, and more particularly to specific features such as gaze direction and initiating a connection to an available avatar.

2. Description of Related Art

Certain people are unable, unwilling, or not desirous of travel to a remote location. Online computer systems provide virtual world experiences that can mimic real travel in a computer environment, including interacting with other persons in remote locales as if one were physically present. However, virtual world interactions are only effective for participants in the relevant virtual world system, and do not permit virtual interactions with persons who are active only in the physical world and do not participate in virtual world activities.

For example, politicians such as Gary Locke or Barack Obama well have been interested in attending the Consumer Electronics Show, yet would have been unable to do so even if security concerns could be met, because their presence at the CES would cause the booth operators to change how they display and behave on the day of the visit, thereby robbing these government officials of the ability to see the show as it really took place. Non-celebrities may also be interested in virtually attending live events, merely to eliminate travel expenses, to enable long-distance learning, to negotiate agreements, or to transfer expert knowledge quickly to a remote location.

However, currently live avatar technology is merely rudimentary in concept and do not fully enable a more natural interaction between the live avatar and other people in the avatar's immediate surroundings, that enables the remote operator to experience the scene as if in the person of the live avatar. In addition, current technology does not support mass distribution of avatar services to enable large-scale commercialization of such services. It is therefore also desirable to provide improvements addressing these and other deficiencies in current avatar technology.

SUMMARY

Accordingly, the following aspects provide for a method and system for directing the gaze of a live avatar in response to control signals from a remote operator. These improvements may enable a more immersive experience for the operator, so that the operator may more fully stand in the person of a remote avatar. The improvements may also enable large-scale commercialization of avatar services, providing both employment for would-be avatars and delivering avatar services to a wider range of consumers.

In an aspect of the disclosure, a method for directing the gaze of a live avatar in response to control signals from a remote operator may include receiving control signals from a first client device operated by a human operator, the control signals indicating a direction of operator gaze relative to a defined body part of the operator. The method may further include controlling a movable optic device in response to the control signals so as to direct a gaze of the live avatar.

In an aspect, the method may further include visibly indicating the relative direction of operator gaze using a visible indicator oriented to the defined body part of the live avatar, the visible indicator being responsive to the control signal to point out the direction of operator gaze relative to the defined body part. For example, the defined body part may be selected from the group consisting of a head and a torso. In such case, the visible indicator may indicate, relative to the head or torso of the live avatar, the gaze direction of the live operator relative to the live operator's head or torso. In the alternative, or in addition, the gaze direction indicated to the live avatar may indicate a direction in which the live avatar should orient his head, torso, and/or eyes to view an object of interest to the remote operator.

In another aspect, the movable optic device may include an optical prism or lens configured to bend light in a defined direction. In such case, the method may further include rotating at least one prism or lens included in the movable optics, in response to the control signals. The live avatar may therefore receive the indication of the gaze direction by looking through the optical prism or lens.

In another aspect, the method may include indicating the relative direction of operator gaze using a haptic device attached to the live avatar. For example, a pressure transducer may provide an impulse or squeeze to the right side of the live avatar's body to direct the gaze of the live avatar rightward, to direct the head of the live avatar rightward, and so forth. In addition, or in the alternative, the method may include communicating commands signals from the first client to the live avatar, using a haptic device attached to the live avatar. For example, the live avatar may interpret a push by a haptic device on the live avatars right foot as a command to walk to the right, and so forth.

In another aspect, the method may further include receiving a video stream from a camera carried or worn by the live avatar, and transmitting the video stream to the first client device for display to the operator. In such case, the method may include controlling the camera direction in response to the control signals, to cause the camera to point in the direction of operator gaze. In addition, or in the alternative, the operator gaze may be defined by the direction in which the camera is oriented, which may be directly controlled by the remote operator. When the camera is directly controlled by the operator, the method may include displaying video images from the video stream to the live avatar, using a heads-up display. The moveable optic device may include the heads-up display. The live avatar may therefore direct his or her own gaze to view the object or scene appearing in the heads-up display. To a person interacting with the live avatar, the live avatar will thereby be actually viewing the same scene as the remote operator, such that the live avatar more fully represents the remote operator. In the alternative, or in addition, the heads-up display may display an arrow or other symbolic indicator to indicate the gaze direction of the operator.

In a variation, cameras may be mounted in additional locations on the live avatar in a manner that allows the operator to see an approximation of the view that the person they are interacting with is seeing. For example, a camera mounted on the back of an avatar's head may allow the operator to see the same thing that a person facing the live avatar is seeing, without requiring the live avatar to turn his head or requiring a camera to pan. Optionally, an indicator may be used to show one or more people interacting with the live avatar that the operator is viewing something behind live avatar or in an alternative direction to where the live avatar is looking.

An apparatus for enabling operation of a live avatar may be adapted for wearing by a person, and may include a processor, a movable optic device coupled to the processor, a wireless network interface coupled to the processor, and a memory coupled to the processor. The memory may hold program instructions, that when executed by the processor, cause the apparatus to receive control signals via the wireless network interface from a first client device operated by a human operator, interpret the control signals as indicating a direction of operator gaze, and to control a movable optic device in response to the control signals so as to direct a gaze of the live avatar. The direction of gaze may be defined relative to a defined body part of the operator (e.g., right, left, up, down, etc.), relative to one or more objects visible to the avatar (e.g., looking at person 'X'), or using a cardinal direction (e.g., north, south, etc.).

The apparatus may further include a visible indicator coupled to the processor and visibly indicating the relative direction of operator gaze oriented to the defined body part of the live avatar, the visible indicator being responsive to the control signal to point out the direction of operator gaze relative to the defined body part. In one implementation, a light or laser dot may be displayed on or near the object that the operator is viewing (or the avatar gaze point). The laser or light dot may coupled with an intensity regulation device and a distance and/or visual processor that together determine when to reduce or increase the intensity of the light or laser dot. For example, when the dot is projected near faces or eyes, it may be dramatically reduced in intensity, turned off, or projected on the body of the person instead of the head, or even in a circle that surrounds but does not intersect with the head or eyes. Increase in intensity may be correlated with increased distance of the display point, just as decrease in intensity may be correlated with decreased distance of the display point.

Stereoscopic cameras on the live avatar may be coupled with stereoscopic displays or glasses on the operator to achieve 3D vision.

In another aspect, the apparatus may include a mechanism coupled to the processor, the mechanism rotating at least one prism or lens included in the movable optics in response to the control signals.

In another aspect, the apparatus may include a haptic device coupled to the processor and indicating the relative direction of operator gaze via an attachment to the live avatar. In the alternative, or in addition, the haptic device or another haptic device may be used to indicate operator commands from the first client device via an attachment to the live avatar.

An electronic name plate showing the identity of the person controlling an avatar may be desirable. Such a nameplate may be altered remotely to reflect the current identity of the operator.

Instructions may be given to the live avatar to gather written materials. Accordingly, the live avatar may be equipped with at least one very high resolution camera capable of transmitting sufficiently high resolution video so that a computer can correct for optical problems (such as an image taken at an angle) and then display or cause a printer to print a copy of the materials. Alternatively, written materials may be gathered with 3D or other bar code or similar technology indicating what materials should be displayed or printed for the operator, and the materials collected remotely from an online database.

In another aspect, the apparatus may include a video stream input coupled to the processor receiving a video stream from a camera carried or worn by the live avatar, wherein the wireless network interface transmits the video stream to the first client device for display to the operator. In such case, the memory may hold further instructions that when executed by the processor, may cause the apparatus to point the camera in the direction of operator gaze relative to the defined body part of the live avatar in response to the control signals. In another aspect, the apparatus may include a heads-up display coupled to the processor and displaying video images from the video stream to the live avatar.

In another aspect, a method enabling commercialization of live avatar services may include a computer server or the like receiving video streams at a first server, the video streams originating from separate video cameras carried at contemporaneous times by different live avatars, and each associated with a respective identifier for ones of the different live avatars. The method may further include serving an interface, the interface indicating identifiers for the different live avatars and enabling each of multiple clients to select at least any one of the video streams associated with the different live avatars. The method may further include receiving selection signals from the multiple clients and initiating connections between the multiple clients and the live avatars for controlling respective ones of the live avatars.

In an aspect, the method may include configuring the interface to include only selected ones of the video streams from live avatars that are not being controlled by any one of multiple clients. In the alternative, or in addition, the method may include configuring the interface to indicate whether respective ones of the live avatars are being controlled by any one of multiple clients. The method may be implemented using one or more computers having port for connecting to a wide area network, using program instructions encoding in a computer-readable storage medium or the like. When executed by a processor of the one or more computers, the instructions may cause the one or more computers to perform the described operations.

A more complete understanding of the method and apparatus for directing the gaze of a live avatar in response to a remote operator, and other aspects, will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION

The present disclosures concerns methods and systems by which a first person can interact virtually with second person located in a place remote from the first person, without requiring the second person to use any kind of artificial communication system. The method and systems also permit the first person to interact with natural, real-world objects and animals located remotely from the first person. The methods and systems utilize a distinction between higher and lower brain function to permit a distant person to control certain activities of a distant, real-world avatar linked to a virtual world computer system. As used herein, "remote" may include a physical separation of any kind that prevents the operator from doing what the live avatar is doing. Generally, physical separation may consist of geographical distance, but may also arise from other constraints, for example, limited access due to security concerns, safety concerns, or other factors which may prevent an operator from entering the immediate environment of the live avatar.

Broadly speaking, there are two kinds of brain function: Higher brain function, such as talking, thinking, observing, learning, and otherwise processing data or movement in a delayed manner ("High Functions"), and lower brain functions, corresponding in many ways to those brain functions present in humans but also in animals without higher brain function, and includes such functions as walking in direction the High Functions direct, moving the mouth, teeth, and other muscles responsible for speaking the words as directed by High Functions, breathing, standing, avoiding objects when walking, and in some cases learned lower function such as operating the mechanical aspects of driving a vehicle ("Lower Functions"). A person capable only of Lower Functions may be able to navigate an environment in a rudimentary manner without falling over objects or falling over.

Implementations may be utilized where the live avatar engages in activities that require certain high level skills, or particularly high quality low level skills, and where the engagement involves activities other than or in addition to interacting with other persons. For example, a live avatar may engage in skydiving, stunts, SCUBA or skiing. Such a live avatar may be permitted to override the instructions of the operator for safety or other reasons and in such a case, such override may be indicated on the live avatar, to the live avatar, to the operator, or a combination thereof. Such implementations may additionally be utilized in conjunction with education or distance learning.

The present technologies may allow those who cannot travel, such as the very ill, the very famous, paraplegics in non-accessible areas, and others, to have a physical presence, or more exactly, a telepresence using another person's physical body. They also allow the person with the physical presence to hide their true identity, to virtually inhabit a person with different physical appearance and characteristics for business, anonymity, or other purposes, or to simply choose a desired or effective telepresence recipient based on performance, physical, or other characteristics. It also solves the problem created when using a robotic device for telepresence, as telepresence through a robotic device may be both unusual enough to intimidate visitors and odd enough to trigger differences in how people interact with the robotic unit.

For the purposes of this disclosure, the person who is not physically present at the event is the "physical attendee" or "live avatar", and the person not physically at the event is the "operator", "virtual attendee", or "remote person".

The present technologies, on a high level, operate by providing the operator with tools to discretely signal desired movements and other actions to the live avatar, optionally without persons interacting with the live avatar being aware of the signals. It should be noted that in certain cases, discrete and/or concealed signals are not preferable, and anything up to and include a live display of instructions or signals visible to those interacting with the live avatar may be implemented. The signals may be sent using a motion-sensing controller, a joystick, a camera, sensors on the body to read movement, direct reading of brain waves, verbal, text, three-dimensional movement (e.g., as sensed using a 3D sensor for example as implemented in the Microsoft® Kinect®) or other signals. The live avatar may receive these signals using similar pathways, including without limitation physical pressure on the portion of the body to be moved, physical pressure on a part of the body that the live avatar is taught how to interpret, information transmitted visually, via audio, via brainwave input, via direct control of certain muscle groups, or otherwise. The live avatar may be equipped with the ability to transmit video and audio from the remote event, and the operator may be equipped with the ability to transmit at least audio signals and optionally video signals to the live avatar, for output to persons in the vicinity of the live avatar. For example, video signals transmitted from the operator may be displayed on a monitor worn on the shirt or other part of the body of the live avatar, or projected from a projector on the live avatar or carried by the live avatar. In one implementation, facial movements of the operator may be transmitted to the live avatar by audio cues (i.e. the word "smile" transmitted through an earpiece) or by directly controlling the muscles by utilizing an electrical current sent to the muscles responsible for that facial movement. In one implementation, the operator may be in a motion simulator, and telemetry and motion data sent back from the live avatar may be utilized to control the motion simulator. In other cases, such motion data and telemetry may be used to provide feedback to the operator in other ways, such as direct neural stimulation or haptics.

The operator and live avatar establish a two way communications connection using a remote communication system, which may connect wirelessly to the live avatar. The live avatar controls all Lower Functions, such as making sure he walks properly without falling, breathing, navigating obstructions, etc. The operator transmits instructions or signals for actions controlled by Higher Functions to the live avatar via the communication system, who then implements the actions in response to the signals. For example, the live avatar might grab a brochure from a table, turn left and walks down that another aisle. Taking the example of Barack Obama attending the CES anonymously, he may "inhabit" a live avatar, direct the live avatar through CES, approach booth operators, talk with them (presumably through a speaker, although potentially through direct control of the voice of the live avatar or through a combination of a speaker and some muscle control to mimic lip movement). As the booth operator responds, the responses are transmitted to Barack Obama, who in turn instructs the live avatar to interact with the booth owner. It should be noted that certain Higher Functions may be left to the live avatar (such as filling in the "blanks" with facial expressions during conversations or operating devices that require Higher Functions, particularly during distance learning). In other cases, certain Lower Functions may be controlled remotely where possible. For example, the Lower Function of sweating may be induced utilizing chemical, medical, or neurological stimulants where it is desirable that the live avatar appear to be sweating.

The present technologies include placing a camera or two cameras, integrated into eyeglasses worn by the operator, one at or near the location of each pupil. The cameras may track movement in the pupils of the operator. In another implementation, the live avatar receives a visual or physical indication of the direction the operator is looking. In a further implementation, glasses worn by the live avatar either optically redirect the gaze of the live avatar to follow the gaze of the operator, or show a dot over the spot the operator is observing. In an implementation, the redirection of the gaze operates to both redirect the apparent gaze of the live avatar when observed by somebody interacting with the live avatar and to direct video data being transmitted from the live avatar to the operator. In the alternative, the video data is generated independently of the live avatar gaze direction, and it may be left to the voluntary cooperation of the live avatar to align his or her gaze with that the camera collecting the video data.

In another implementation, an intermediate person or computer exists between the operator and the live avatar to translate from one language to another. In an implementation, the live avatar speaks the language needed at the event, and directly translates audio received from the operator into the language needed at the event. Language transmitted from the event to the operator may be translated by the live avatar, but in an implementation is transmitted from the live avatar to a person or computer where it is then translated into the operator's language and replayed to the operator in that language, with or without the operator being able to hear the original untranslated version and/or ambient noises at the event.

In another implementation, control of live avatars may be switched between various different operators and likewise feedback from live avatars directed to the currently controlling operator. This may permit the number of operators and the number of live avatars to differ. In one implementation, one or more operators monitor the input from one or more live avatars and, when the input indicates that the operator is in an area of interest, the operator "inhabits" the live avatar, taking control for the period the operator desires. The live avatar may receive a signal indicating that control has been taken or relinquished. When control is relinquished, the live avatar may be given (or operates on previously given) instructions as to what items, places or events to proceed to.

In another implementation, the live avatar may multicast to multiple operators. The operators may be given control over the live avatar via an algorithmic mechanism, such as by spending money or units of "control credit", by region the live avatar is located in (as measured by GPS or other mechanisms), randomly, or by other selection criteria. In one implementation, the live avatar may be "transmit only" and enable people to voyeuristically experience the sights and sounds as seen by the live avatar. One such example might be to equip an entire professional hockey team with binocular cameras and stereo microphones, allowing a plurality of operators to "occupy" players of their choice during a professional hockey game—playing the role of goalie for a period, then forward, etc.

In one implementation, the location of the live avatar on a larger map may be indicated to the operator utilizing GPS, triangulation, dead reckoning, or other methods.

In certain implementations, it may be important for the operator or those interacting with the live avatar to know when a live avatar is performing other than as expected. In one implementation, the operator may actuate an indicator light or display on or near the avatar, or activate a tactile or audible signal, to indicate that the avatar is not performing as expected. In another implementation, a computer may detect when the avatar is not obeying instructions (which may include a threshold, such as not obeying instructions to within a certain tolerance), and upon such detection may alert the operator, the live avatar, and/or other persons such as those interacting with the live avatar. Alerts may be audible, a warning light, a displayed message, or other appropriate method. Additionally, an indicator may be utilized to indicate when a live avatar is inhabited by an operator, and optionally the identity or some other information about the inhabitant (for example, a name, a geographic location, a gender, resume information, and/or other information). An indicator may also show connection speed and/or quality between the live avatar and the operator. Such an indication may permit those interacting with the avatar to understand that delays in response are not necessarily indicative of delays by the operator or live avatar, but rather traced to latency in transmission, processing delays, or even the limitations of the speed of light. An indicator may also be used to show a lost connection, and may indicate the length of time that the connection has been lost. An indicator may also be used to show that some data is being lost in transmission, such as packet loss.

Compensation may be incorporated for communications latency. In one implementation, an indicator as to the amount of latency or delay may be utilized to indicate to third parties how much delay to expect.

A system computer server may enable the operator/live avatar methods as disclosed herein, using one or more processors, a network interface, and a computer memory. The computer memory may hold instructions, that when executed by the one or more processors, cause the server to perform the actions of: receiving control signals from a first client operated by a human operator, the control signals indicating a direction of operator gaze relative to a defined body part of the operator, and transmitting information to a second client, the information indicating the relative direction of operator gaze for providing a visible indication thereof to a live avatar connected to the second client. In addition, or in the alternative, the computer memory may hold instructions, that when executed by the one or more processors, cause the server to perform the actions of: receiving video streams at a first server, the video streams originating from separate video cameras worn or carried by different persons participating in a live event, and each associated with a respective identifier for ones of the different persons; serving an interface, the interface indicating identifiers for the different persons and enabling each of multiple clients to select at least any one of the video streams associated with the different persons participating in the live event; receiving selection signals from the multiple clients; and directing the video streams in response to the selection signals.

Figure 1:
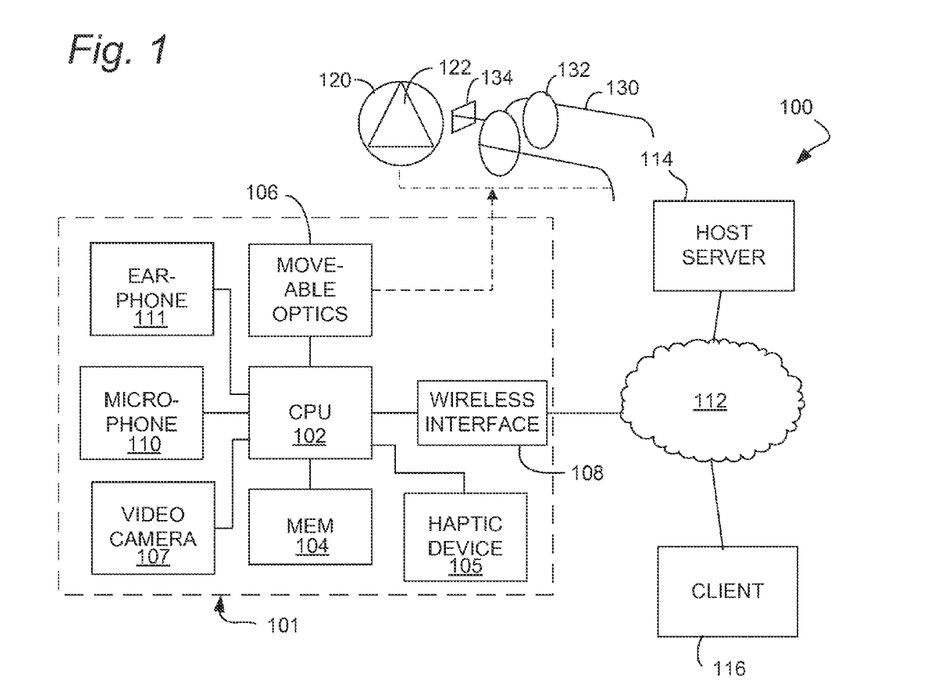
FIG. 1 is a block diagram illustrating an apparatus for directing the gaze of a live avatar in response to a remote operator.

For example, referring to FIG. 1, an apparatus 101 for enabling operation of a live avatar may be adapted for wearing by a person, and may include a processor 102, a movable optic device 106 coupled to the processor, a wireless network interface 108 coupled to the processor, and a memory 104 coupled to the processor. The apparatus may be in communication with a remote client 116 via one or more networks 112 in a system 100. The system 100 may also include one or more host servers 114 for initiating and/or managing a connection between the avatar apparatus 101 and the client 116. The client 116 may include any suitable computing device, for example, a personal computer, laptop computer, notebook computer, smart phone, or the like, able to receive user input via one or more user interface devices and provide a video display and audio output reflecting audio-video input that is collected using the avatar apparatus

101. The apparatus 101 may be powered using a portable battery pack or the like, to enable free mobility of the live avatar.

To that end, the apparatus 101 may further include a video camera 107 and a microphone 110, both coupled to the processor 102, and/or appropriate input/output jacks for receiving video input from a camera and audio input from a microphone or the like. The apparatus may further include one or more drive motors (not shown) for controlling the orientation of the camera 107 or microphone 110. The apparatus 101 may further include a headphone or earphone 111 (and/or audio output port for connecting a suitable headphone, earphone, or other audio output device), to provide the live avatar with audible instructions or other audible feedback from the operator of the client 116.

The memory 104 may hold program instructions, that when executed by the processor, cause the apparatus to receive control signals via the wireless network interface 108 from the client device 116 operated by a human operator, interpret the control signals as indicating a direction of operator gaze, and to control a movable optic device 106 in response to the control signals so as to direct a gaze of the live avatar. The direction of gaze may be defined relative to a defined body part of the operator (e.g., right, left, up, down, etc.), relative to one or more objects visible to the avatar (e.g., looking at person 'X'), or using a cardinal direction (e.g., north, south, etc.).

The apparatus 101 may further include a visible indicator coupled to the processor and visibly indicating the relative direction of operator gaze oriented to the defined body part of the live avatar, the visible indicator being responsive to the control signal to point out the direction of operator gaze relative to the defined body part. The visible indicator may be incorporated into the movable optics 106.

In another aspect, the movable optics 106 of the apparatus 101 may include a mechanism 120 coupled to the processor, the mechanism 120 rotating at least one prism 122 or lens included in the movable optics 106, in response to the control signals.

In another aspect, the apparatus may include a video stream input coupled to the processor receiving a video stream from a camera 107 carried or worn by the live avatar, wherein the wireless network interface 108 transmits the video stream to the first client device for display to the operator. In such case, the memory 104 may hold further instructions that when executed by the processor, may cause the apparatus 101 to point the camera 107 in the direction of operator gaze in response to the control signals. In another aspect, the apparatus 101 may include a heads-up display 134 coupled to the processor 102 and displaying video images from the video stream to the live avatar. The displayed video stream may enable the live avatar to see what the operator is viewing so that the operator can look at the same object or scene. Thus, a person viewing or interacting with the live avatar may receive a natural-appearing visual cue of where the operator is looking, by the gaze direction of the live avatar. The heads-up display 134 may be coupled to eyewear 130 or other head-mounted apparatus of the live avatar. The eyewear 130 may include one or more lenses 132. The controllable prism 122 or other light-bending lens may be included in the lens 132. By looking through the lens, the avatar may receive an indication of the object or scene.

Of course, the operator may simply tell the avatar what the operator is viewing, via an earphone 111. The moveable optics device 106 does not necessarily replace or foreclose the use of audible instructions concerning gaze direction or other matters. However, the moveable optics 106 may be used to supplement audible communications and provide a more subtle, continuous, and wordless indication of operator gaze direction. Thus, the moveable optics 106 may enable the live avatar to more effectively and continuously act in the person of the operator, thereby enhancing the performance of a live avatar service using the apparatus 101.

In addition, or in the alternative, the apparatus 101 may include a haptic device 105 coupled to the processor and indicating the relative direction of operator gaze via an attachment to the live avatar. The example, a pressure transducer (e.g., a localized vibratory transducer) may be affixed at one or more points of the live avatar's body using straps or the like, and concealed under articles of clothing. The haptic device may readily and wordlessly communicate a gaze direction relative to the live avatar's body, by triggering a sensation on the right or left to indicate a desired movement right or left, placed forwards or back to indicate up/down, and providing other tactile feedback to indicate when the avatar's gaze is aligned with the remote operator, or is not aligned. In the alternative, or in addition, the haptic device or another haptic device may be used to indicate operator commands from the first client device via an attachment to the live avatar, such as, for example, move right, left, forward or backward.

Figures 2, 4:
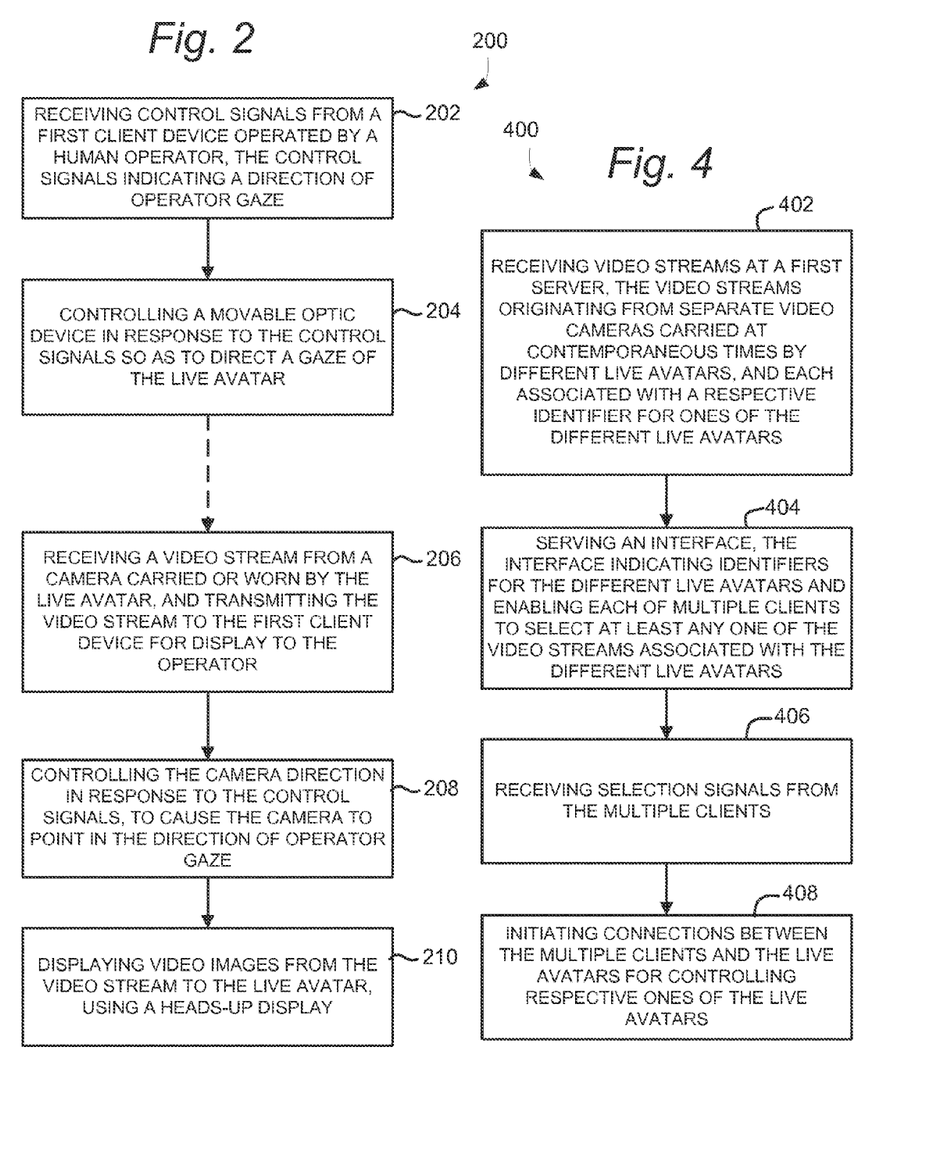
FIG. 2 is a block diagram illustrating a method for directing the gaze of a live avatar in response to a remote operator.
FIG. 4 is a block diagram illustrating a method for providing an interface between a live avatar and a remote operator.

In accordance with the described system 100, a method 200 for directing the gaze of a live avatar may be performed, as shown in FIG. 2. The method 200 may be performed, for example, using an apparatus 101 as described in connection with FIG. 1. The method 200 may include, at 202, receiving control signals from a remote client device operated by a human operator, the control signals indicating a direction of operator gaze relative to a defined body part of the operator. The method 200 may further include, a 204, controlling a movable optic device in response to the control signals so as to direct a gaze of the live avatar. As used herein, to "direct a gaze" means to provide an indication to a person of where the person should look, or an indication of which object in the person's vicinity the person should look at, using the wireless communication apparatus 101. The directing of the gaze at 204 may be performed wordlessly and continuously. The control signals controlling the direction of gaze may be generated automatically using the operator's client device, as further described herein.

In an optional aspect, the method 200 may further include visibly indicating the relative direction of operator gaze using a visible indicator oriented to the defined body part of the live avatar, the visible indicator being responsive to the control signal to point out the direction of operator gaze relative to the defined body part. For example, the defined body part may be selected from the group consisting of a head and a torso. In such case, the visible indicator may indicate, relative to the head or torso of the live avatar, the gaze direction of the live operator relative to the live operator's head or torso. In the alternative, or in addition, the gaze direction indicated to the live avatar may indicate a direction in which the live avatar should orient his head, torso, and/or eyes to view an object of interest to the remote operator. Examples of visual indicators have been provided herein, and may include, for example, a low-power laser dot or an arrow displayed on a head-up display.

In another optional aspect, the movable optic device may include an optical prism or lens configured to bend light in a defined direction. In such case, the method 200 may further include rotating at least one prism or lens included in the movable optics, in response to the control signals. The live avatar may therefore receive the indication of the gaze direction by looking through the optical prism or lens.

In another optional aspect, the method 200 may include indicating the relative direction of operator gaze using a haptic device attached to the live avatar. For example, a pressure transducer may provide an impulse or squeeze to the right side of the live avatar's body to direct the gaze of the live avatar rightward, and so forth. In addition, or in the alternative, the method may include communicating commands signals from the first client to the live avatar, using a haptic device attached to the live avatar. For example, the live avatar may interpret a push by a haptic device on the live avatars right foot as a command to walk to the right, and so forth.

In another optional aspect, the method 200 may further include, at 206, receiving a video stream from a camera carried or worn by the live avatar, and transmitting the video stream to the first client device for display to the operator. In such case, the method 200 may include, at 208, controlling the camera direction in response to the control signals, to cause the camera to point in the direction of operator gaze. In addition, or in the alternative, the operator gaze may be defined by the direction in which the camera is oriented, which may be directly controlled by the remote operator. When the camera is directly controlled by the operator, the method 200 may include, at 210, displaying video images from the video stream to the live avatar, using a heads-up display. The moveable optic device may include the heads-up display. The live avatar may therefore direct his or her own gaze to view the object or scene appearing in the heads-up display. To a person interacting with the live avatar, the live avatar will thereby be actually viewing the same scene as the remote operator, such that the live avatar more fully represents the remote operator. In the alternative, or in addition, the heads-up display may display an arrow or other symbolic indicator to indicate the gaze direction of the operator.

Figure 3:
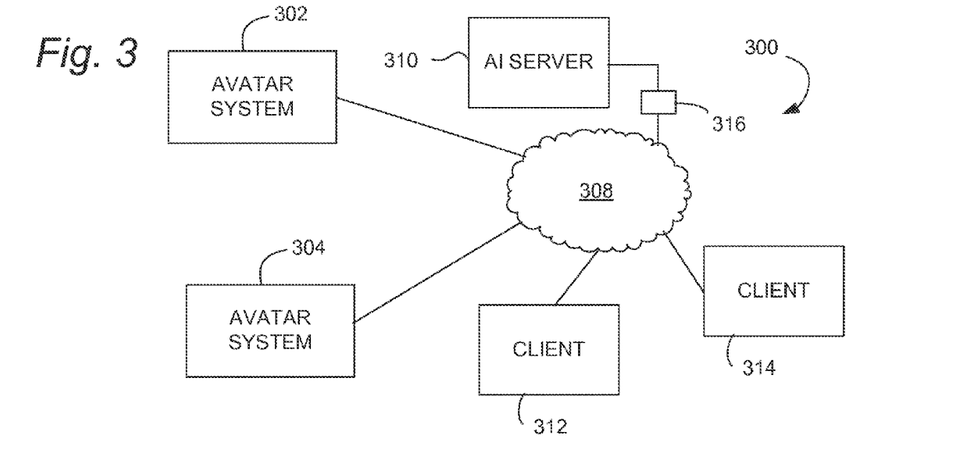
FIG. 3 is a block diagram illustrating a system for providing an interface between a live avatar and a remote operator.

FIG. 3 illustrates a system 300 for aggregating multiple live avatars 302, 304 (two of many shown) and multiple clients 312, 314 (two of many shown) via a host Avatar Interface (AI) server 310. The AI server 310 may include one or more component computers connected in a hierarchical or peer-to-peer relationship, in communication with the clients 312, 314 through the World Wide Web or other networked system using one or more communications networks 308. The AI server 310 may serve a network interface document 316, e.g., an HTML or XML interface document for initiating and managing connections between the clients 312, 314 and the avatars 302, 304. The AI server 310 may also host a back-end database for caching or long-term storing of live avatar audio-video feeds, managing live avatar and operator accounts, managing back-end administration, and managing commerce aspects or live avatar services. Clients 312, 314 may be configured as any suitable computing client, as described elsewhere herein. The avatar systems 302 may include any suitable embodiment of the avatar apparatus 101 as disclosed herein in connection with FIG. 1, or elsewhere in the present disclosure.

An AI server 310 as shown in FIG. 3 may be used to perform a method 400 for initiating live avatar sessions with multiple clients, as diagrammed in FIG. 4. The method 400 may enable commercialization of live avatar services to an essentially unlimited marketplace of prospective clients. The method 400 may include a computer server or the like, at 402, receiving video streams at a first server. Each video stream may be, or may include, a live video feed originating from one of separate video cameras carried at contemporaneous times by different live avatars. Each video stream may be associated with a respective identifier for ones of the different live avatars, and optionally with a description of a particular live event that the avatar is participating in. The method 400 may further include, at 404, serving an interface, the interface indicating identifiers for the different live avatars and enabling each of multiple clients to select at least any one of the video streams associated with the different live avatars. The interface may indicate other information pertinent to the live avatar service, for example, other information regarding the live event where the live avatar is present, hourly rates for each live avatar, or technical features of the avatar apparatus in use by each avatar. The method 400 may further include, at 406, receiving selection signals from the multiple clients, each selecting signal indicating one of the multiple live avatars to which a client desires to initiate a live avatar session. The method 400 may further include, at 408, initiating connections between the multiple clients and the live avatars for controlling respective ones of the live avatars. For example, the AI server may provide each client with address and security information with which the client may establish a live avatar session with a particular avatar system. Optionally, the AI server may collect a fee prior to initiating a session, or may track the length of each ongoing session and debit a user account accordingly. The AI server may also cache video streams from the avatars, or other live avatar session data, for administrative or archival purposes.

In an aspect, the method 400 may include the server configuring the interface to include only selected ones of the video streams from live avatars that are not being controlled by any one of multiple clients. In the alternative, or in addition, the method 400 may include configuring the interface to indicate whether respective ones of the live avatars are being controlled by any one of multiple clients. The method may be implemented using one or more computers having at least one port for connecting to a wide area network, using program instructions encoding in a computer-readable storage medium or the like. When executed by a processor of the one or more computers, the instructions may cause the one or more computers to perform the described operations.

What is claimed is:
1. A method, comprising:
receiving video streams at a first server, each of the video streams originating from separate video cameras carried at contemporaneous times by multiple live avatars, wherein the live avatars are persons participating in a live event and each video stream is associated with an identifier for one of the multiple live avatars;
serving an interface, the interface indicating the identifiers for the multiple live avatars and enabling an operator to monitor the video streams from the multiple live avatars, and when one or more live avatars are in an area of interest, select at least one of the video streams;
receiving at least one selection signal from the operator;
initiating at least one connection between the operator and the one or more live avatars for providing control instructions;
for each connection initiated, receiving control signals from the operator, the control signals indicating a direction of gaze for a connected live avatar; and
controlling a movable optic device in response to the control signals so as to direct the gaze of the connected live avatar.

2. The method of claim 1, further comprising configuring the interface to include only selected ones of the video streams from live avatars that are not being provided control instructions by another operator.

3. The method of claim 1, further comprising configuring the interface to indicate whether respective ones of the live avatars are being provided control instructions by another operator.

4. The method of claim 1, wherein serving the interface further comprises serving a network interface document configured for initiating and managing connections between multiple operators and the multiple live avatars.

5. The method of claim 1, wherein serving the interface comprises indicating service information pertinent to use of the multiple live avatars via the connections.

6. The method of claim 5, wherein the service information comprises information selected from: a description of a live event where one or more of the multiple live avatars is present, hourly rates for each of the multiple live avatars, and technical features of avatar apparatus in use by each of the multiple Jive avatars.

7. The method of claim 1, wherein serving the interface further comprises providing an interface for forming user contracts for renting the connections between operators and the multiple live avatars for specified periods of time.

8. The method of claim 7, further comprising collecting, via the interface, a fee prior to initiating each of the connections.

9. The method of claim 7, further comprising tracking a duration of each of the connections and debiting associated user accounts accordingly.

10. A server apparatus comprising at least one processor coupled to a memory, the memory holding instructions that when executed by the at least one processor cause the server apparatus to perform:
receiving audio streams, each of the audio streams originating from separate microphones carried at contemporaneous times by multiple live avatars, wherein the live avatars are persons participating in a live event and each audio stream is associated with an identifier for one of the multiple live avatars;
serving an interface, the interface indicating the identifiers for the multiple live avatars and enabling an operator to monitor the audio streams from the multiple live avatars, and when one or more live avatars are in an area of interest, select at least one of the audio streams;
receiving at least one selection signal from the operator;
initiating at least one connection between the operator and the one or more live avatars for providing control instructions;
for each connection initiated, receiving control signals from the operator, the control signals indicating a direction of movement for a connected live avatar;
for each connection initiated, controlling at least one haptic device attached to the connected live avatar in response to the control signals so as to direct the movement of the connected live avatar.

11. The server apparatus of claim 10, wherein the memory holds further instructions for configuring the interface to include only selected ones of the audio streams from live avatars that are not being provided control instructions by another operator.

12. The server apparatus of claim 10, wherein the memory holds further instructions for configuring the interface to indicate whether respective ones of the live avatars are being provided control instructions by another operator.

13. The server apparatus of claim 10, wherein the memory holds further instructions for serving the interface at least in part by serving a network interface document configured for initiating and managing connections between multiple operators and the multiple live avatars.

14. The server apparatus of claim 10, wherein the memory holds further instructions for serving the interface including indicating service information pertinent to use of the multiple live avatars via the connections.

15. The server apparatus of claim 14, wherein the service information comprises information selected from: a description of a live event where one or more of the multiple live avatars is present, hourly rates for each of the multiple live avatars, and technical features of avatar apparatus in use by each of the multiple live avatars.

16. The server apparatus of claim 10, wherein the memory holds further instructions for serving the interface including providing an interface for forming user contracts for renting the connections between the operators and the live avatars for specified periods of time.

17. The server apparatus of claim 16, wherein the memory holds further instructions for collecting, via the interface, a fee prior to initiating each of the connections.

18. The server apparatus of claim 16, wherein the memory holds further instructions for tracking a duration of each of the connections and debiting associated user accounts accordingly.

19. A method, comprising:
receiving video streams at a first server, each of the video streams originating from separate video cameras carried at contemporaneous times by multiple live avatars, wherein the live avatars are persons participating in a live event and each video stream is associated with an identifier for one of the multiple live avatars;
serving an interface, the interface indicating the identifiers for the multiple live avatars and enabling an operator to monitor the video streams from the multiple live avatars, and when one or more live avatars are in an area of interest, select the video streams associated with the one or more live avatars;
receiving selection signals from the operator;
initiating connections between the one or more live avatars and the operator based on the selection signals from the operator;
for each connection initiated, receiving control signals from the operator, the control signals indicating a direction of movement for a connected live avatar; and
for each connection initiated, controlling at least one haptic device attached to the connected live avatar in response to the control signals so as to direct the movement of the connected live avatar.

20. The method of claim 19, further comprising, when control of a live avatar is taken or relinquished, sending a signal to the live avatar.

* * * * *